(12) United States Patent
Benmimoun et al.

(10) Patent No.: US 11,584,383 B2
(45) Date of Patent: Feb. 21, 2023

(54) VEHICLE FEATURE AVAILABILITY DETECTION

(71) Applicant: Ford Global Technologies, LLC, Dearborn, MI (US)

(72) Inventors: Ahmed Benmimoun, Aachen/NRW (DE); Chenhao Ma, Canton, MI (US); Tony Tae-Jin Pak, Garden City, MI (US); Thomas Gerlitz, Aachen/NRW (DE); Hamid M. Golgiri, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 291 days.

(21) Appl. No.: 17/090,952

(22) Filed: Nov. 6, 2020

(65) Prior Publication Data

US 2022/0144294 A1 May 12, 2022

(51) Int. Cl.
*B60W 50/035* (2012.01)
*G07C 5/04* (2006.01)
*B60W 50/00* (2006.01)

(52) U.S. Cl.
CPC ............. *B60W 50/035* (2013.01); *G07C 5/04* (2013.01); *B60W 2050/0026* (2013.01)

(58) Field of Classification Search
CPC .. B60W 50/035; B60W 50/029; B60W 50/04; B60W 50/14; B60W 2050/0026; B60W 2050/0295; B60W 2050/146; B60W 2050/043; B60W 2556/45; G07C 5/04; G07C 5/008; G07C 5/0841
See application file for complete search history.

(56) References Cited

U.S. PATENT DOCUMENTS

| | | | |
|---|---|---|---|
| 9,308,913 B2 | 4/2016 | Mukaiyama | |
| 9,580,080 B1* | 2/2017 | Letwin | ................ B60W 50/082 |
| 10,137,903 B2 | 11/2018 | Tascione et al. | |
| 10,824,145 B1* | 11/2020 | Konrardy | ................ G06F 30/20 |
| 2012/0323690 A1* | 12/2012 | Michael | ............. G01C 21/3605 |
| | | | 705/14.58 |
| 2014/0062349 A1* | 3/2014 | Isayeva | .................... G05B 9/02 |
| | | | 318/139 |
| 2017/0090480 A1* | 3/2017 | Ho | ........................ G05D 1/0027 |

(Continued)

FOREIGN PATENT DOCUMENTS

| | | |
|---|---|---|
| CN | 111376894 A | 7/2020 |
| DE | 102016226309 A1 * | 7/2018 |
| KR | 101399736 B1 | 6/2014 |

*Primary Examiner* — Mary Cheung
(74) *Attorney, Agent, or Firm* — Frank A. MacKenzie; Bejin Bieneman PLC (57) ABSTRACT

While a vehicle is in an off state, expiration of a timer and receipt of a first message from a user device are monitored. Upon determining that at least one of the timer has expired or that the first message is received from the user device, a communication network onboard the vehicle is then monitored for a specified set of fault conditions. Upon detecting, on the onboard vehicle communication network, a fault condition included in the set of fault conditions, the fault condition is then identified as one of transient or persistent. A user assist feature of the vehicle is disabled upon identifying that the fault condition is transient and that a second message was received from the user device after the fault condition was detected.

20 Claims, 4 Drawing Sheets

(56) References Cited

U.S. PATENT DOCUMENTS

| | | | |
|---|---|---|---|
| 2020/0125117 A1* | 4/2020 | Switkes | H04W 4/029 |
| 2020/0326190 A1* | 10/2020 | Miyao | G01S 19/16 |
| 2021/0053579 A1* | 2/2021 | Gaudin | B60W 50/045 |
| 2021/0315192 A1* | 10/2021 | Wiesenberg | A01M 1/226 |

* cited by examiner

Fig. 3B

VEHICLE FEATURE AVAILABILITY DETECTION

BACKGROUND

A vehicle can be equipped with electronic and electromechanical components, e.g., computing devices, networks, sensors and controllers, etc. A vehicle computer can acquire data regarding the vehicle's environment and can operate the vehicle or at least some components thereof based on the acquired data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

A system includes a computer including a processor and a memory, the memory storing instructions executable by the processor to, while a vehicle is in an off state, monitor for expiration of a timer and for receipt of a first message from a user device. The instructions further include instructions to, upon determining that at least one of the timer has expired or that the first message is received from the user device, then monitor a communication network onboard the vehicle for a specified set of fault conditions. The instructions further include instructions to, upon detecting, on the onboard vehicle communication network, a fault condition included in the set of fault conditions, then identify the fault condition as one of transient or persistent. The instructions further include instructions to disable a user assist feature of the vehicle upon identifying that the fault condition is transient and that a second message was received from the user device after the fault condition was identified.

The instructions can further include instructions to disable a user assist feature of the vehicle additionally upon identifying that the fault condition is persistent.

The instructions can further include instructions to, upon identifying the fault condition as transient, reset the timer and maintain the user assist feature in an enabled state.

The instructions can further include instructions to, upon resetting the timer, monitor for expiration of the timer and for receipt of a second message from the user device. The instructions can further include instructions to, upon determining that at least one of the timer has expired or that the second message is received from the user device, then monitor the communication network onboard the vehicle for the fault condition. The instructions can further include instructions to, upon detecting, on the onboard vehicle communication network, the fault condition, disable the user assist feature.

The instructions can further include instructions to, upon detecting, on the onboard vehicle communication network, no fault conditions, operate the vehicle to a location of the user device based on receiving a request from the user device.

The instructions can further include instructions to, upon disabling the user assist feature, provide a message to the user device specifying the user assist feature is disabled.

The user device can include a second processor and a second memory. The second memory can store instructions executable by the second processor to, upon receiving the message, disable detection of a user input, via a user interface, to select the user assist feature.

The instructions can further include instructions to, upon detecting, on the onboard vehicle communication network, no fault conditions, maintain the user assist feature in an enabled state.

The instructions can further include instructions to operate the vehicle to a location of the user device based on receiving a request from the user device.

The user device can include a second processor and a second memory. The second memory can store instructions executable by the second processor to determine the request based on detecting a user input, via a user interface, to select the user assist feature.

The instructions can further include instructions to, upon identifying the fault condition as transient, disable the user assist feature additionally based on determining a specified future time is less than a predetermined time from a current time. The specified future time may be a time when the vehicle is requested to arrive at a location of the user device.

The instructions can further include instructions to, upon disabling the user assist feature, maintain a current position of the vehicle.

The instructions can further include instructions to access a look-up table to identify the fault condition as transient or persistent.

The instructions can further include instructions to, upon determining that at least one of the timer has expired or that the first message is received from the user device, transition the vehicle to a minimal power state and provide electrical power to a subset of vehicle components. The subset may include each vehicle component associated with the user assist feature.

A method includes, while a vehicle is in an off state, monitoring for expiration of a timer and for receipt of a first message from a user device. The method further includes, upon determining that at least one of the timer has expired or that the first message is received from the user device, then monitoring a communication network onboard the vehicle for a specified set of fault conditions. The method further includes, upon detecting, on the onboard vehicle communication network, a fault condition included in the set of fault conditions, then identifying the fault condition as one of transient or persistent. The method further includes disabling a user assist feature of the vehicle upon identifying that the fault condition is transient and that a second message was received from the user device after the fault condition was identified.

The method can further include, upon identifying the fault condition as transient, resetting the timer and maintaining the user assist feature in an enabled state.

The method can further include, upon resetting the timer, monitoring for expiration of the timer and for receipt of a second message from the user device. The method can further include, upon determining that at least one of the timer has expired or that the second message is received from the user device, then monitoring the communication network onboard the vehicle for the fault condition. The method can further include, upon detecting, on the onboard vehicle communication network, the fault condition, disabling the user assist feature.

The method can further include, upon disabling the user assist feature, maintaining a current position of the vehicle.

The method can further include, upon identifying the fault condition as transient, disabling the user assist feature additionally based on determining a specified future time is less than a predetermined time from a current time. The specified future time may be a time when the vehicle is requested to arrive at a location of the user device.

The method can further include, upon determining that at least one of the timer has expired or that the first message is received from the user device, transitioning the vehicle to a minimal power state and providing electrical power to a subset of vehicle components. The subset may include each vehicle component associated with the user assist feature.

Further disclosed herein is a computing device programmed to execute any of the above method steps. Yet further disclosed herein is a computer program product, including a computer readable medium storing instructions executable by a computer processor, to execute an of the above method steps.

A vehicle can include one or more user assist features. A user assist feature is an operation in a vehicle to actuate one or more vehicle components based on vehicle operating data from vehicle sensors and/or components to assist or supplement user operation of the vehicle. For example, a vehicle computer can at least partially control the vehicle based on the user assist features. An example user assist feature is lane-keeping, in which the vehicle computer controls actuators and/or components to maintain the vehicle in a lane of a road. The vehicle computer can receive sensor data, e.g., indicating road markings, signs, other vehicles, etc., and can initiate a user assist feature, the user assist feature including to actuate one or more vehicle components based on the sensor data. During startup of the vehicle, a plurality of vehicle components are activated to prepare the vehicle for operation. The vehicle components may undergo diagnostic testing to confirm that the vehicle components are operational prior to operating the vehicle based on the user assist feature. However, the vehicle computer may be unable to complete the diagnostic test within an amount of time after startup that would allow the vehicle to operate based on the user assist feature to complete a task, e.g., operating to a specified location at a specified time, requested by the user.

Advantageously, the vehicle computer can transition the vehicle between activation states, i.e., power states that specify a presence or absence of electrical power supplied to components, to determine components are operational via diagnostic tests prior to receiving a user request, which allows the vehicle computer to operate the vehicle based on the user assist feature within the amount of time after startup to complete the task requested by the user. Additionally, the vehicle computer can notify the user prior to the specified time that the user assist feature is disabled based on determining one or more components are not operational via the diagnostic test.

Figure 1:
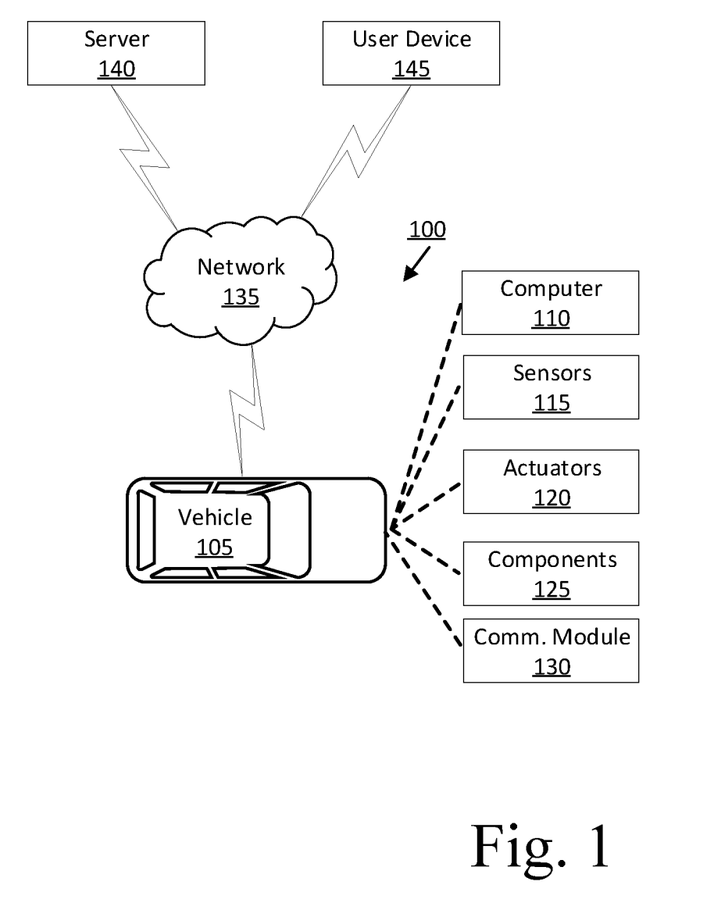
FIG. 1 is a block diagram illustrating an example vehicle control system for a vehicle.
Figure 2:
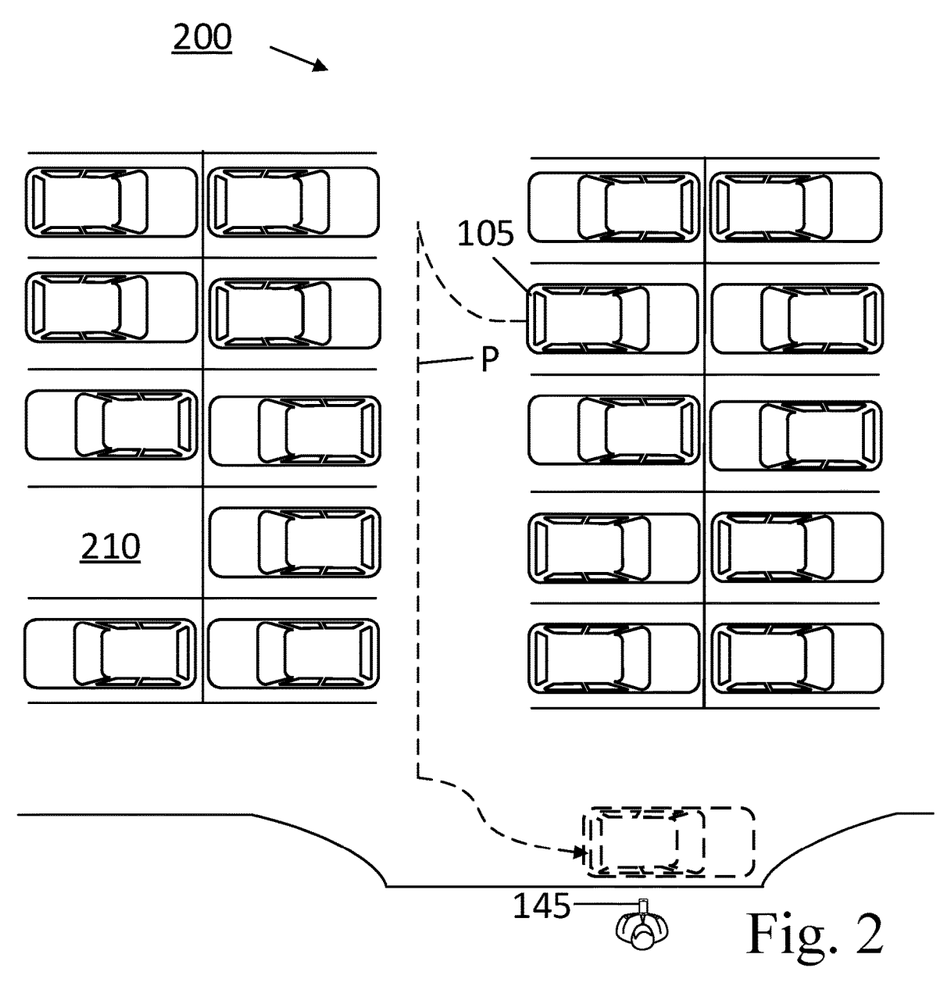
FIG. 2 is a diagram illustrating operating the vehicle according to the system of FIG. 1.

With reference to FIGS. 1-2, an example vehicle control system 100 includes a vehicle 105. A vehicle computer 110 in the vehicle 105 receives data from sensors 115. The vehicle computer 110 is programmed to, while the vehicle 105 is in an off state, monitor for expiration of a timer and for receipt of a first message from a user device 145. The vehicle computer 110 is further programmed to, upon determining that at least one of the timer has expired or that the first message is received from the user device, then monitor a communication network onboard the vehicle 105 for a specified set of fault conditions. The vehicle computer 110 is further programmed to, upon detecting, on the onboard vehicle communication network, a fault condition included in the set of fault conditions, then identify the fault condition as one of transient or persistent. The vehicle computer 110 is further programmed to disable a user assist feature of the vehicle 105 upon identifying that the fault condition is transient and that a second message was received from the user device 145 after the fault condition was detected.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, a user device 145, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

The user device 145 can be a conventional computing device, i.e., including one or more processors and one or more memories, programmed to provide operations such as disclosed herein. The user device 145 can be a portable device. A portable device can be any one of a variety of computers that can be used while carried by a person, e.g., a smartphone, a tablet, a personal digital assistant, a smart watch, etc.

The user device 145 includes a user interface. The user interface includes user input devices such as knobs, buttons, switches, pedals, levers, touchscreens, and/or microphones, etc. The input devices may include sensors 115 to detect user inputs and provide user input data to the vehicle computer 110. That is, the vehicle computer 110 may be programmed to receive user input from the user interface. The user may provide each user input via the user interface, e.g., by pressing a virtual button on a touchscreen display, by providing voice commands, etc. For example, a touchscreen display included in the user interface may include sensors 115 to detect that a user pressed a virtual button on the touchscreen display to, e.g., request operation of the vehicle, schedule a pick-up time, etc., which input can be received in the vehicle computer 110 and used to determine the selection of the user input.

The user interface typically further includes output devices such as displays (including touchscreen displays), speakers, and/or lights, etc., that output signals or data to the user. Upon receiving data input from the user, the user device 145 can transmit the specified data to the vehicle computer 110, e.g., via the network 135.

FIG. 2 is a diagram illustrating a vehicle 105 operating in an example ground surface area 200 that includes marked sub-areas 210 (e.g., parking spaces) for vehicles. An area 200 may be on a street or road, e.g., a defined parking area alongside a curb or an edge of the street, a parking lot or structure or portion thereof, etc. The vehicle computer 110 may be programmed to determine the vehicle 105 is within the area 200 by, e.g., GPS-based geo-fencing. In such an example, the GPS geo-fence specifies a perimeter of the area 200. The vehicle computer 110 can then determine that the vehicle 105 is within the area 200 based on the location data of the vehicle 105 indicating the vehicle 105 is within the geo-fence. A sub-area 210 may, for example, be a parking space indicated by conventional markings, e.g., painted lines on a ground surface, and conventional image recognition techniques can be employed by the vehicle computer 110 to identify the sub-area 210.

The vehicle computer 110 can be programmed to determine the vehicle 105 is in a sub-area 210, e.g., stopped or parked in the sub-area 210. For example, the vehicle computer 110 can compare a location of the vehicle 105, e.g., based on image data, GPS data, etc., to the sub-area 210. As another example, the vehicle computer can analyze sensor 115 data, e.g., image data to determine that the vehicle 105 is approximately centered laterally and longitudinally relative to the sub-area 210, e.g., based on conventional markings indicating a parking space.

The vehicle computer 110 may be programmed to operate the vehicle 105 based at least partially on one or more user assist features. For example, the vehicle computer 110 may initiate one or more assist features to supplement or assist the user in operating the vehicle 105, e.g., in the area 200 based on sensor 115 data. That is, the vehicle computer 110 may initiate one or more assist features to aid the user in operating the vehicle 105 in the area 200 based on sensor 115 data. As another example, the vehicle computer 110 may initiate one or more assist features to operate the vehicle 105 in the area 200, e.g., without input from the user. For example, the user assist feature may be a valet assist feature. Based on the valet assist feature, the vehicle computer 110 is programmed to operate the vehicle 105 from the sub-area 210 to a location of the user device 145, e.g., upon receiving a request from the user device 145 and/or at a time specified by the user device 145. That is, the vehicle computer 110 may actuate one or more host vehicle components 125 to control the vehicle 105, e.g., apply brakes, propel the host vehicle 105, etc., to move from the sub-area 210 to the location of the user device 145. Each user assist feature specifies operating parameters, i.e., a measurable set of physical parameters, for one or more vehicle components 125, such as a braking, steering, propulsion, etc.

The vehicle computer 110 may receive the location of the user, e.g., GPS coordinates, from the user device 145. For example, the user device 145 may transmit location data of the user device 145 to the vehicle computer 110, e.g., via the network 135. The location data may specify a current location or a specified future location of the user. The user device 145 may determine the location of the user based on sensor data or a user input, as discussed below.

The vehicle computer 110 is programmed to manage startup and shutdown of the vehicle 105. For example, upon determining the vehicle 105 is in the sub-area 210, the vehicle computer 110 can shutdown the vehicle 105. That is, the vehicle computer 110 can transition the vehicle 105 between activation states. As another example, the vehicle computer 110 can shutdown the vehicle 105 based on receiving a request from, e.g., the server 140, user input to a power button in a passenger cabin of the vehicle 105, etc. In this context, an "activation state" specifies a power state of vehicle components 125, i.e., whether, and/or an amount that, a component 125 is electrically powered during startup and/or shutdown of the vehicle 105, e.g., unpowered, powered with a specific power supply, etc.

The activation state can be one of an off state, a minimal power state, and an on state. In the on state, all vehicle components 125 are available to be actuated by the vehicle computer 110 to operate the vehicle 105 based at least partially on the user assist feature(s). In the off state, the vehicle computer 110 and components 125 are substantially powered off to conserve energy when the vehicle 105 is not in use, i.e., parked in the sub-area 210. In the minimal power state, the vehicle computer 110 actuates one or more vehicle components 125 to prepare for operation of the vehicle 105 based at least partially on the assist feature(s). For example, the vehicle computer 110 can actuate a power supply to provide electricity to the vehicle components 125 associated with, i.e., used to operate the vehicle 105 to provide, the valet assist feature.

The power supply provides electricity to one or more components 125. The power supply can include one or more batteries, e.g., 12-volt lithium-ion batteries, and one or more power networks to supply power from the batteries to the components 125. In the on state, the power supply provides power to all of the vehicle components 125. In the minimal power state, the power supply may provide power to a subset, i.e., some but less than all, of the vehicle components 125. For example, the power supply may provide power to the vehicle components 125 associated with the valet assist feature. In the off state, the power supply does not provide power to the vehicle components 125. The vehicle computer 110 can receive power from the power supply regardless of the activation state. The vehicle computer 110 can actuate the power supply based on the activation state.

While transitioning the vehicle 105 from the on state to the off state, the vehicle computer 110 is programmed to monitor the vehicle network to detect a fault condition, as discussed below. Upon detecting the fault condition, e.g., as the vehicle 105 is transitioning to the off state, the vehicle computer 110 can store the detected fault condition, e.g., in the memory of the vehicle computer 110. In this context, a "fault condition" is a condition of a vehicle component 125 that impairs operation and/or gives rise to repair and/or maintenance needs. A fault condition can include a defect or degradation of the vehicle component 125. That is, the fault condition indicates a detection that the component 125 is not operating within one or more specified parameters. A fault condition can be specified according to a Diagnostic Trouble Code (DTC), OBD-II Trouble Code, or the like.

In the off state, the vehicle computer 110 monitors for expiration of a first timer and for receipt of a first message from the user device 145. For example, upon transitioning the vehicle 105 to the off state, the vehicle computer 110 can initiate the first timer. The vehicle 105 can remain in the off state until the first timer expires. The vehicle computer 110 can transition the vehicle 105 to the minimal power mode based on passage of a time period, e.g., expiration of the first timer. That is, the vehicle computer 110 can instruct the power supply to provide power to the vehicle components 125 associated with the valet assist feature when the first timer expires. The time period may, for example, be a predetermined time period, e.g., 5 minutes, 30 minutes, 60 minutes, etc. The time period may be stored, e.g., in a memory of the vehicle computer 110.

Alternatively, the vehicle 105 can remain in the off state until the vehicle computer 110 receives a first message from the user device 145, e.g., via the network 135. The first message is a request to initiate startup of the vehicle 105, i.e., to transition from the off state to the minimal power state. The vehicle computer 110 can transition to the minimal power state based on receiving the first message, e.g., prior to expiration of the first timer. That is, the vehicle computer 110 can instruct the power supply to provide power to the vehicle components 125 associated with the valet assist feature when vehicle computer 110 receives the first message.

Upon transitioning the vehicle 105 to the minimal power state, the vehicle computer 110 is programmed to monitor the vehicle network to detect a specified set of fault conditions. For example, the vehicle computer 110 can receive, via the vehicle network, one or more fault conditions from one or more electronic control units (ECUs). The specified fault conditions may be stored, e.g., in a memory of the vehicle computer 110. The specified fault conditions are the fault conditions for each vehicle component 125 associated with the respective assist feature, e.g., the valet assist feature. An "electronic control unit" is a device including a processor and a memory that includes programming to control one or more vehicle components 125. The ECU can communicate with the vehicle computer 110 and other ECUs over the vehicle network.

In general, the ECU(s) can perform a conventional self-diagnostic test to detect fault conditions in the vehicle component(s) 125 associated with the valet assist feature to confirm that the vehicle 105 can operate based on the valet assist feature. To perform the diagnostic text, the ECU receives diagnostic data from one or more sensors 115 monitoring the respective vehicle component(s) 125. The ECU then determines whether the component 125 is capable of operation based on comparing the diagnostic data to the specified parameters. If the diagnostic data is outside the specified parameters, then the ECU determines and outputs a fault condition. That is, if the ECU determines a fault condition in the vehicle component(s) 125 associated with the valet assist feature, the diagnostic data indicates that the vehicle 105 cannot be operated based on the valet assist feature, and the vehicle component(s) 125 associated with the valet assist feature require(s) repair or replacement. The ECU can then provide the fault condition to the vehicle computer 110, e.g., via the vehicle network.

Upon receiving the fault condition, the vehicle computer 110 compares the fault condition to the specified fault conditions. If the fault condition does not match one of the specified fault conditions, then the vehicle computer 110 determines that the vehicle 105 can be operated based on the valet assist feature. If the fault condition matches one of the specified fault conditions, the vehicle computer 110 can identify the fault condition as one of persistent or transient. Additionally, or alternatively, the vehicle computer 110 can compare the stored fault condition, i.e., the fault condition detected while transitioning the vehicle 105 from the on state to the off state, to the specified fault conditions. If the stored fault condition does not match one of the specified fault conditions, then the vehicle computer 110 determines that the vehicle 105 can be operated based on the valet assist feature. If the stored fault condition matches one of the specified fault conditions, the vehicle computer 110 can identify the fault condition as one of persistent or transient.

A persistent fault condition is a fault condition that cannot be resolved upon transitioning a vehicle between activation states. A transient fault condition is a fault condition that may be resolved upon transitioning a vehicle between activation states. To "resolve" the fault condition means that the condition that initiated the fault condition is no longer present. For example, if a door is opened when the vehicle 105 transitions to the off state, the vehicle computer 110 may determine a fault condition of the door being ajar. The fault condition may be resolved by closing the door while the vehicle 105 in the off state and then transitioning the vehicle 105 to the minimal power state or on state. In such an example, the respective ECU may determine no fault conditions for the door when the vehicle 105 is transitioned to the minimal power state or on state, e.g., via a subsequent diagnostic test. As another example, a transient fault condition may be resolved upon determining that a time elapsed from detecting the fault condition exceeds a time period.

The vehicle computer 110 can identify the fault condition as transient or persistent based on a look-up table or the like, e.g., stored in a memory of the vehicle computer 110. The look-up table may associate various fault conditions with either persistent or transient fault conditions. The vehicle computer 110 can, for example, access the look-up table and determine the detected fault condition is a persistent or transient fault condition based on a stored fault condition matching the detected fault condition. Upon identifying the fault condition, the vehicle computer 110 can store the fault condition, e.g., in the memory of the vehicle computer 110.

The vehicle computer 110 is programmed to transition the valet assist feature from an enabled state to a disabled state, i.e., preventing the valet assist feature from being provided, based on identifying the fault condition as a persistent fault condition. When the valet assist feature is in the disabled state, the vehicle computer 110 may maintain a position of the vehicle 105. For example, the vehicle computer 110 can actuate one or more vehicle components 125 to maintain the vehicle 105 at the current position, i.e., in the sub-area 210. That is, the vehicle computer 110 may prevent the vehicle 105 from departing the sub-area 210.

Additionally, the vehicle computer 110 is programmed to transition the valet assist feature to the disabled state based on a number of identified transient fault conditions. Upon identifying the fault condition as a transient fault condition, the vehicle computer 110 can determine the number of identified transient fault conditions. The vehicle computer 110 can be programmed to determine the number of identified transient fault conditions by counting each identified transient fault condition. For example, upon identifying a first transient fault condition, the vehicle computer 110 can increase the number of first transient fault conditions by one. That is, the vehicle computer 110 determines the number of identified transient fault conditions after completion of each diagnostic test. If the number of first transient fault conditions is greater than a predefined threshold, e.g., one, the vehicle computer 110 is programmed to transition the valet assist feature to the disabled state. If the number of first transient fault conditions is less than or equal to the predefined threshold, then the vehicle computer 110 can maintain the valet assist feature in the enabled state. The vehicle computer 110 can store the number of each identified transient fault condition, e.g., in a memory of the vehicle computer 110. The predefined threshold may be stored, e.g., in a memory of the vehicle computer 110. The predefined threshold may be specified by a vehicle and/or component manufacturer.

Additionally, the vehicle computer 110 is programmed to transition the valet assist feature to the disabled state based on identifying the fault condition as a transient fault condition and receiving a second message from the user device 145 after the fault condition was identified. That is, the vehicle computer 110 disables the valet assist feature if the user device 145 remains in communication with the vehicle computer 110 after the fault condition is identified as a transient fault condition. For example, after identifying the fault condition, the vehicle computer 110 can monitor for receipt of the second message prior to passage of a second time period, e.g., expiration of a second timer. In this situation, the vehicle computer 110 can initiate the second timer upon identifying the fault condition as a transient fault condition. The second time period may, for example, be a predetermined time period, e.g., 30 seconds, 1 minute, 5 minutes, etc. The second time period may be stored, e.g., in a memory of the vehicle computer 110. If the vehicle computer 110 receives the second message prior to the passage of the second time period, the vehicle computer 110 is programmed to transition the valet assist feature to the disabled state. If the vehicle computer 110 does not receive the second message prior to the passage of the second time period, then the vehicle computer 110 can maintain the valet assist feature in the enabled state. The duration of the second timer is less than the duration of the first timer.

Additionally, the vehicle computer 110 is programmed to transition the valet assist feature to the disabled state based on a specified future time. The specified future time is a time when the vehicle 105 is requested to arrive at the location of the user device 145. The vehicle computer 110 can receive the specified future time from the user device 145, e.g., via the network 135. For example, the user can provide an input, e.g., via the user interface, requesting the vehicle 105 arrive at a location at a future time. That is, the user device 145 can receive the specified future time and the specified future location from a user input, as discussed below. The user device 145 can then provide the specified future time and specified future location to the vehicle computer 110. For example, the user device 145 can transmit the specified future time and the specified future location to the vehicle computer 110, e.g., via the network 135.

Upon receiving the specified future time, the vehicle computer 110 can compare the specified future time to the current time. Specifically, the vehicle computer 110 can determine a time difference, i.e., an amount of time, between the specified future time and the current time. The vehicle computer 110 can then compare the time difference to a threshold. The threshold can be determined empirically, e.g., by determining a minimum amount of time within which a transient fault condition can be resolved by the vehicle computer 110 transitioning the vehicle 105 between activation states and receiving output of a diagnostic test from an ECU. The threshold is less than the duration of the first timer. If the time difference is less than the threshold, the vehicle computer 110 transitions the valet assist feature to the disabled state. If the time difference is greater than or equal to the threshold, the vehicle computer 110 can maintain the valet assist feature in the enabled state.

Additionally, upon transitioning the valet assist feature to the disabled state, the vehicle computer 110 can provide a message to the user device 145. For example, the vehicle computer 110 can transmit the message to the user device 145, e.g., via the network 135. The message specifies that the valet assist feature is disabled, and the vehicle computer 110 cannot operate the vehicle 105 to the location of the user device 145.

Upon determining to maintain the valet assist feature in the enabled state, the vehicle computer 110 is programmed to reset the first timer. That is, the vehicle computer 110 sets the first timer to the predetermined time period. Upon resetting the first timer, the vehicle computer 110 can transition the vehicle 105 from the minimal power state to the off state. The vehicle 105 can remain in the off state until the first timer expires or the vehicle computer 110 receives a third message from the user device 145. The third message is substantially the same as the first message except the third message is received after the vehicle 105 is transitioned from the minimal power state to the off state. Upon the first timer expiring or receiving the third message, the vehicle computer 110 can transition the vehicle 105 to the minimal power state, as discussed above.

The vehicle computer 110 is programmed to then monitor the vehicle network to detect the specified set of fault conditions. For example, the ECU(s) can determine a fault condition via a second diagnostic test and output the fault condition to the vehicle computer 110, e.g., via the vehicle network, in substantially the same manner as discussed above. If the vehicle computer 110 detects the first transient fault condition after the second diagnostic test, then the vehicle computer 110 increases the number of first transient fault conditions by one. The vehicle computer 110 then compares the number of first transient fault conditions to the predefined threshold, as discussed above. The vehicle computer 110 then disables the valet assist feature if the number of first transient fault conditions is greater than the predefined threshold, as discussed above.

Additionally, if the vehicle computer 110 detects a fault condition other than the first fault condition after the second diagnostic test, then the vehicle computer 110 can identify the other fault condition in substantially the same manner as discussed above. If the vehicle computer 110 detects no fault conditions after the second diagnostic test, then the vehicle computer 110 maintains the valet assist feature in the enabled state. The vehicle computer 110 can detect fault conditions following successive diagnostic tests performed by the ECUs in substantially the same manner.

When the valet assist feature is in the enabled state, the vehicle computer 110 can operate the vehicle 105 from the sub-area 210 to the location of the user device 145 based on receiving a request from the user device 145 (as discussed below). For example, the vehicle computer 110 may actuate one or more vehicle components 125 to move the vehicle 105 from the sub-area 210 to the location of the user device 145.

In the enabled state, the vehicle computer 110 can, for example, generate a planned path P, e.g., from the sub-area 210 to the location of the user device 145, to operate the vehicle 105 in the area 200. Alternatively, the server 140 can generate the planned path P, e.g., from the sub-area 210 to the location of the user device 145, and provide the planned path P to the vehicle computer 110, e.g., via the network 135. As used herein, a "path" is a set of points, e.g., that can be specified as coordinates with respect to a vehicle coordinate system and/or geo-coordinates, that the first computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \quad (1)$$

where $a_0$ an offset, i.e., a lateral distance between the path and a center line of the host vehicle 105 at the upcoming distance x, $a_1$ is a heading angle of the path, $a_2$ is the curvature of the path, and $a_3$ is the curvature rate of the path.

The user device 145 is programmed to run one or more applications stored in a memory. An "application" is programming stored in the memory that includes instructions that the processor of the user device 145 executes to perform an operation. For example, the application can be a vehicle valet application that includes instructions to transmit data from the user device 145 to the vehicle computer 110 and to receive data from the vehicle computer 110. That is, the vehicle valet application includes instructions for the user device 145 to communicate with the vehicle computer 110. Example communications by the vehicle valet application includes, e.g., transmission of a pick-up request, a specified time, a specified location, whether the valet assist feature is enabled or disabled, etc. The vehicle valet application enables a user to request a vehicle 105 operate to a specified location and at a specified time to allow the user to access the vehicle 105.

The user device 145 is programmed to receive a first user input selecting the vehicle valet application. For example, the user device 145 may actuate the user interface to detect a first user input selecting the vehicle valet application. For example, the user interface may be programmed to display a virtual button on a touchscreen display that the user can press to select the vehicle valet application. In other words, the user interface may activate sensors that can detect the user pressing the virtual button to select the vehicle valet application. Upon detecting the first user input, the user interface can then provide the first user input to the user device 145, and the user device 145 can select the vehicle valet application.

Upon selecting the vehicle valet application, the user device 145 can initiate communication between the user device 145 and the vehicle computer 110. For example, the user device 145 can transmit a first message, e.g., via the network 135, to the vehicle computer 110 requesting to initiate startup of the vehicle 105, i.e., to transition from the off state to the minimal power state. Additionally, the user device 145 can actuate the user interface to detect a second user input deselecting the vehicle valet application. For example, the user interface may be programmed to display a virtual button or the like on a touchscreen included in the user interface that the user can press or otherwise select to deselect the vehicle valet application. In other words, the user interface may activate sensors that can detect the user pressing the virtual button to deselect the vehicle valet application. Upon detecting the second user input, the user interface can then provide the second user input to the user device 145, and the user device 145 can deselect the vehicle valet application based on the second user input. In this situation, the user device 145 stops communicating with the vehicle computer 110.

Additionally, the user device 145 can actuate the user interface to detect a third user input requesting vehicle operation based on the valet assist feature, i.e., the vehicle 105 to operate to a specified location and at a specified time to allow a user to access the vehicle 105. For example, the user interface may be programmed to display a virtual button on the user interface that the user can press to request vehicle operation based on the valet assist feature. In other words, the user interface may activate sensors that can detect the user pressing the virtual button to request vehicle operation based on the valet assist feature. Upon detecting the third user input, the user interface can then provide the third user input to the user device 145, and the user device 145 can provide a request to the vehicle computer 110 based on the third user input. The request is a request to operate the vehicle 105 based on the valet assist feature.

Additionally, the user device 145 may also provide a user location and/or a time for the vehicle 105 to arrive at the user location. For example, the user device 145 may receive location data, e.g., GPS coordinates, of the user device 145 from one or more sensors in the user device 145. In such an example, the user device 145 can then transmit the location data of the user device 145 to the vehicle computer 110, e.g., in a same or different transmission as the request. That is, the user device 145 can provide a current location of the user to the vehicle computer 110. Additionally, or alternatively, the user interface may activate sensors that can detect a user pressing virtual buttons, which correspond to alphanumeric characters, to specify the user location and/or a time for the vehicle 105 to arrive at the user location. In such an example, the user can specify, e.g., via a user input, a future time and/or a future location. The user device 145 can then transmit the future time and/or the future location to the vehicle computer 110, e.g., via a same or different transmission as the request.

The user device 145 can receive the message from the vehicle computer 110 specifying the valet assist feature is disabled. In this situation, the user device 145 actuates the user interface to disable, i.e., prevent or ignore, detection of the third user input. Said differently, the user device 145 prevents the user from requesting vehicle operation based on the valet assist feature. For example, the user interface may be programmed to remove a virtual button from the user interface display. As another example, the user device 145 may be programmed to make the virtual button non-selectable. In other words, the user interface may deactivate sensors that can detect the user pressing the virtual button to request vehicle operation based on the valet assist feature. Additionally, upon receiving the message from the vehicle computer 110, the user device 145 can display, e.g., via the user interface, the message specifying the valet assist feature is disabled.

Figure 3A:
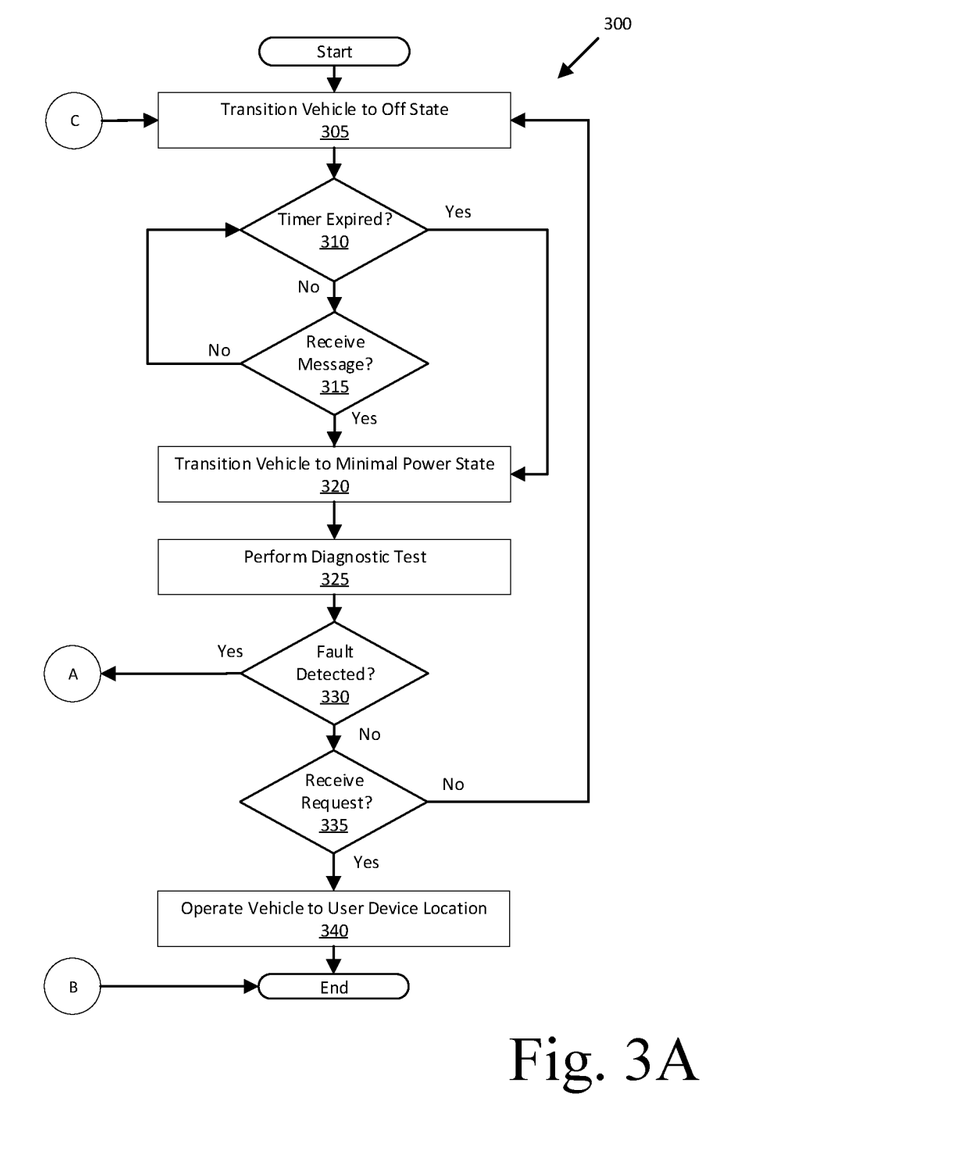
FIG. 3A is a first part of a flowchart of an example process for operating the vehicle.

FIG. 3A is a first portion of a flowchart of an example process 300 (the second portion being shown in FIG. 3B because the entire flowchart will not fit on a single drawing sheet) for operating a vehicle 105. The process 300 begins in a block 305. The process 300 can be carried out by a vehicle computer 110 included in the vehicle 105 executing program instructions stored in a memory thereof.

In the block 305, the vehicle computer 110 is programmed to transition the vehicle 105 between activation states, and specifically, to an off state. For example, the vehicle computer 110 can determine the vehicle 105 is in a sub-area 210 based on sensor 115 data or map data, as discussed above. The vehicle computer 110 can then shutdown the vehicle 105, i.e., transition the vehicle 105 from an on state to the off state. As another example, the vehicle computer 110 can shutdown the vehicle 105 based on receiving a request from, e.g., the server 140, user input to a power button in a passenger cabin of the vehicle, etc. 105. In the on state, all vehicle components 125 are available to be actuated by the computer 110 to operate based on one or more assist features, as discussed above. In the off state, the vehicle computer 110 and components 125 are substantially powered off to conserve energy when the vehicle 105 is not in use, i.e., parked in the sub-area 210, as discussed above. While transitions the vehicle 105 from the on state to the off state, the vehicle computer 110 can monitor the vehicle network to detect a fault condition. Upon detecting a fault condition, the vehicle computer 110 stores the fault condition, e.g., in a memory of the vehicle computer 110. The process 300 continues in a block 310.

In the block 310, while the vehicle 105 is in the off state, the vehicle computer 110 determines whether a first timer has expired. Upon transitioning the vehicle 105 to the off state, the vehicle computer 110 can initiate the first timer. If the first timer has not expired, then the process 300 continues in a block 315. If the first timer has expired, then the process 300 continues in a block 320.

In the block 315, the vehicle computer 110 determines whether a first message has been received from a user device 145. The first message is a request to initiate startup of the vehicle 105, i.e., to transition from the off state to the minimal power state, as discussed above. The vehicle computer 110 may receive the first message via the network 135. If the vehicle computer 110 receives the first message from the user device 145, then the process 300 continues in the block 320. Otherwise, the process 300 returns to the block 310.

In the block 320, the vehicle computer 110 transitions the vehicle 105 from the off state to the minimal power state. In the minimal power state, the vehicle computer 110 actuates one or more vehicle components 125 to prepare for operation of the vehicle 105 based on one or more assist features. For example, the vehicle computer 110 can actuate a power supply to provide electricity to the vehicle components 125 associated with, i.e., required to operate the vehicle 105 based on, the valet assist feature.

In the block 325, the vehicle computer 110 monitors the vehicle network to detect a fault condition. For example, the vehicle computer 110 can receive, via the vehicle network, one or more fault conditions from one or more ECUs. The ECUs can, for example, determine a fault condition via a diagnostic test, as discussed above. After completing the diagnostic test, the ECU can output a fault condition based on determining diagnostic data is outside specified parameters, or no fault conditions based on determining the diagnostic data is within the specified parameters. The ECU can then transmit a message to the vehicle computer 110, e.g., via the vehicle network, indicating a fault condition or no fault conditions. The process 300 continues in a block 330.

In the block 330, the vehicle computer 110 determines whether a fault condition was detected. If the vehicle computer 110 receives a fault condition from the ECU, e.g., via the vehicle network, the vehicle computer 110 compares the fault condition to a set of specified fault conditions. Additionally, if the vehicle computer 110 stored a fault condition while transitioning from the on state to the off state, the vehicle computer 110 can compare the stored fault condition to the set of specified fault conditions. The specified fault conditions are the fault conditions for each vehicle component 125 associated with the respective assist feature, e.g., the valet assist feature. If the detected (or stored) fault condition matches a specified fault condition, the vehicle computer 110 determines the vehicle 105 cannot be operated based on the valet assist feature because fault conditions are present in the vehicle component(s) 125 associated with the valet assist feature. If the detected (or stored) fault condition does not match a specified fault condition, or if no fault conditions are received (or stored), the vehicle computer 110 determines the vehicle 105 can be operated based on the valet assist feature because no fault conditions are present in the vehicle component(s) 125 associated with the valet assist feature. If no fault conditions are associated with the valet assist feature, then the process 300 continues in a block 335. Otherwise, the process 300 continues in a block 345.

In the block 335, the vehicle computer 110 determines whether a request was received from the user device 145. For example, the vehicle computer 110 can receive the request via the network 135. The request is a request to operate the vehicle 105 based on the valet assist feature. The user device 145 may determine the request based on a user input, as discussed above. Additionally, the user device 145 can provide a user location and/or a time for the vehicle 105 to arrive at the user location, as discussed above. If the vehicle computer 110 receives the request, the process 300 continues in a block 340. Otherwise, the process 300 returns to the block 305.

In the block 340, the vehicle computer 110 operates the vehicle 105 based on the valet assist feature. For example, the vehicle computer 110 can generate a path from the sub-area 210 to the specified location, as discussed above. The vehicle computer 110 can then actuate one or more vehicle components 125 to move the vehicle along the path to arrive at the specified location at the specified time. The process 300 ends following the block 340.

Figure 3B:
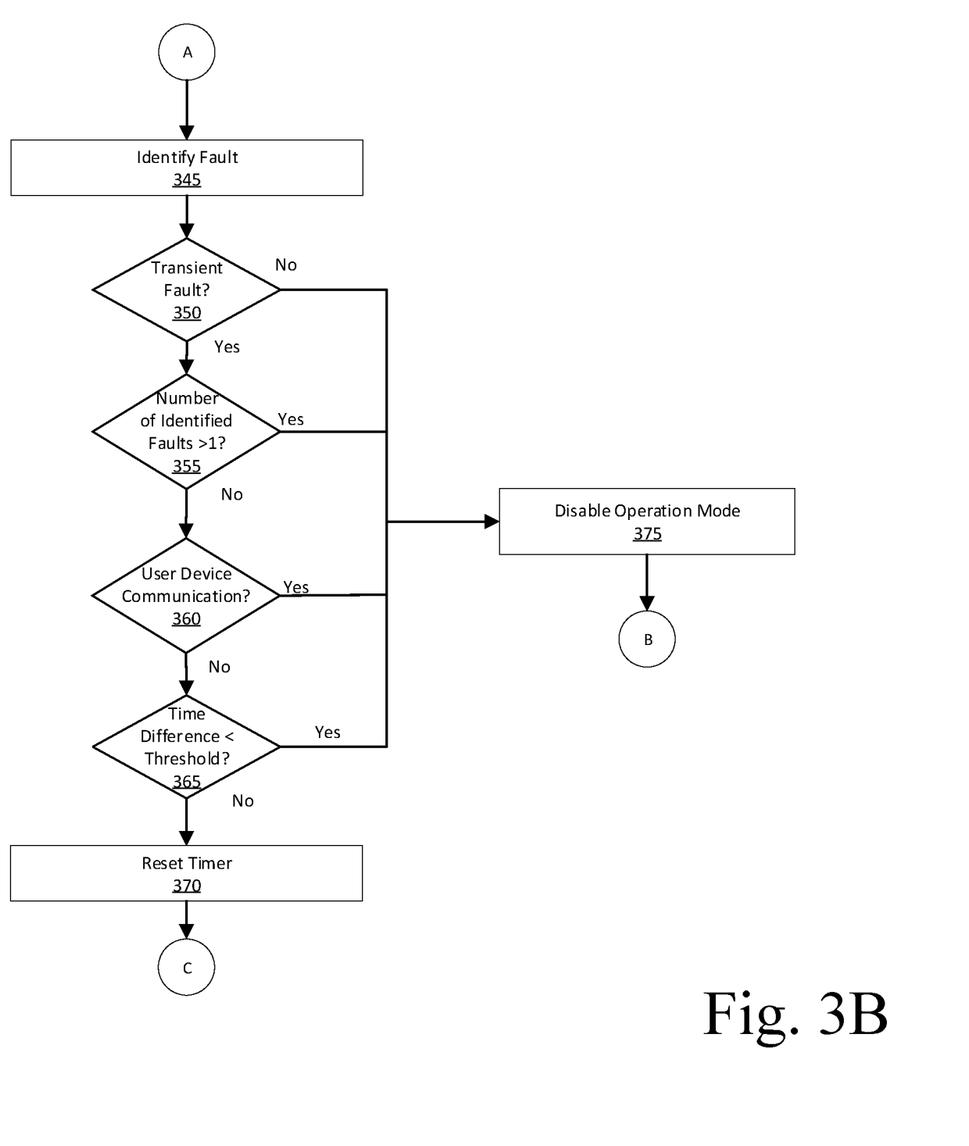
FIG. 3B is a second part of the flowchart of FIG. 3A.

Turning now to FIG. 3B, following the block 330 shown in FIG. 3A, in the block 345, the vehicle computer 110 determines whether the fault condition is a transient fault condition. That is, the vehicle computer 110 can identify the fault condition as one of persistent or transient. For example, the vehicle computer 110 can access a look-up table, e.g., stored in a memory of the vehicle computer 110. The look-up table may associate various fault conditions with either persistent or transient fault conditions. The vehicle computer 110 can identify the fault condition based on a stored fault condition in the look-up table matching the detected fault condition. If the vehicle computer 110 identifies the fault condition as a transient fault condition, the process 300 continues in a block 350. Otherwise, the process 300 continues in a block 370.

In the block 350, the vehicle computer 110 determines whether a number of identified transient fault conditions is greater than a predefined threshold. The vehicle computer 110 can be programmed to determine the number of identified transient fault conditions by counting each identified transient fault condition, as discussed above. For example, upon identifying a first transient fault condition, the vehicle computer 110 can increase the number of first transient fault conditions by one. If the number of first transient fault conditions is greater than the predefined threshold, e.g., one, the process 300 continues in the block 370. Otherwise, the process 300 continues in a block 355.

In the block 355, the vehicle computer 110 determines whether a second message is received from the user device 145 after the fault condition is identified. For example, after identifying the fault condition in the block 345, the vehicle computer 110 can initiate a second timer, as discussed above. If the vehicle computer 110 receives the second message prior to the expiration of the second timer, the process 300 continues in the block 370. Otherwise, the process 300 continues in a block 360.

In the block 360, the vehicle computer 110 determines whether a specified future time is within a threshold of a current time. The specified future time is a time when the vehicle is requested to arrive at the location of the user device, as set forth above. The vehicle computer 110 can receive the specified future time from the user device 145, e.g., via the network 135, as discussed above. Upon receiving the specified future time, the vehicle computer 110 can compare the specified future time to the current time. Specifically, the vehicle computer 110 can determine a time difference, i.e., an amount of time, between the specified future time and the current time. The vehicle computer 110 can then compare the time difference to a threshold (as discussed above). If the time difference is less than the threshold, the process 300 continues in the block 370. Otherwise, the process 300 continues in a block 365.

In the block 365, the vehicle computer 110 is programmed to reset the first timer. That is, the vehicle computer 110 sets the first timer to the predetermined time period, as discussed above. The process 300 returns to the block 305.

In the block 375, the vehicle computer 110 transitions the valet assist feature from an enabled state to a disabled state. When the valet assist feature is in the disabled state, the vehicle computer 110 may maintain a position of the vehicle 105. For example, the vehicle computer 110 can actuate one or more vehicle components 125 to maintain the vehicle 105 at the current position, i.e., in the sub-area 210. That is, the vehicle computer 110 may prevent the vehicle 105 from departing the sub-area 210. Additionally, the vehicle computer 110 can transmit a message, e.g., via the network 135, to the user device 145 specifying that the valet assist feature is disabled. The user device 145 can then prevent the user from requesting vehicle operation based on the valet assist feature. For example, the user interface may deactivate sensors that can detect the user pressing the virtual button to request vehicle operation based on the valet assist feature, as discussed above. The process 300 ends following the block 370.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   while a vehicle is in an off state, monitor for expiration of a timer and for receipt of a first message from a user device;
   upon determining that at least one of the timer has expired or that the first message is received from the user device, then monitor a communication network onboard the vehicle for a specified set of fault conditions;
   upon detecting, on the onboard vehicle communication network, a fault condition included in the set of fault conditions, then identify the fault condition as one of transient or persistent; and
   disable a user assist feature of the vehicle upon identifying that the fault condition is transient and that a second message was received from the user device after the fault condition was identified.

2. The system of claim 1, wherein the instructions further include instructions to disable a user assist feature of the vehicle additionally upon identifying that the fault condition is persistent.

3. The system of claim 1, wherein the instructions further include instructions to, upon identifying the fault condition as transient, reset the timer and maintain the user assist feature in an enabled state.

4. The system of claim 3, wherein the instructions further include instructions to:
   upon resetting the timer, monitor for expiration of the timer and for receipt of a second message from the user device;
   upon determining that at least one of the timer has expired or that the second message is received from the user device, then monitor the communication network onboard the vehicle for the fault condition;
   upon detecting, on the onboard vehicle communication network, the fault condition, disable the user assist feature.

5. The system of claim 3, wherein the instructions further include instructions to, upon detecting, on the onboard vehicle communication network, no fault conditions, operate the vehicle to a location of the user device based on receiving a request from the user device.

6. The system of claim 1, wherein the instructions further include instructions to, upon disabling the user assist feature, provide a message to the user device specifying the user assist feature is disabled.

7. The system of claim 6, wherein the user device includes a second processor and a second memory, the second memory storing instructions executable by the second processor to, upon receiving the message, disable detection of a user input, via a user interface, to select the user assist feature.

8. The system of claim 1, wherein the instructions further include instructions to, upon detecting, on the onboard vehicle communication network, no fault conditions, maintain the user assist feature in an enabled state.

9. The system of claim 8, wherein the instructions further include instructions to operate the vehicle to a location of the user device based on receiving a request from the user device.

10. The system of claim 9, wherein the user device includes a second processor and a second memory, the second memory storing instructions executable by the second processor to determine the request based on detecting a user input, via a user interface, to select the user assist feature.

11. The system of claim 1, wherein the instructions further include instructions to, upon identifying the fault condition as transient, disable the user assist feature additionally based on determining a specified future time is less than a predetermined time from a current time, the specified future time being a time when the vehicle is requested to arrive at a location of the user device.

12. The system of claim 1, wherein the instructions further include instructions to, upon disabling the user assist feature, maintain a current position of the vehicle.

13. The system of claim 1, wherein the instructions further include instructions to access a look-up table to identify the fault condition as transient or persistent.

14. The system of claim 1, wherein the instructions further include instructions to, upon determining that at least one of the timer has expired or that the first message is received from the user device, transition the vehicle to a minimal power state and provide electrical power to a subset of vehicle components, the subset including each vehicle component associated with the user assist feature.

15. A method, comprising:
    while a vehicle is in an off state, monitoring for expiration of a timer and for receipt of a first message from a user device;
    upon determining that at least one of the timer has expired or that the first message is received from the user device, then monitoring a communication network onboard the vehicle for a specified set of fault conditions;
    upon detecting, on the onboard vehicle communication network, a fault condition included in the set of fault conditions, then identifying the fault condition as one of transient or persistent; and
    disabling a user assist feature of the vehicle upon identifying that the fault condition is transient and that a second message was received from the user device after the fault condition was identified.

16. The method of claim 15, further comprising, upon identifying the fault condition as transient, resetting the timer and maintaining the user assist feature in an enabled state.

17. The method of claim 16, further comprising:
    upon resetting the timer, monitoring for expiration of the timer and for receipt of a second message from the user device;
    upon determining that at least one of the timer has expired or that the second message is received from the user device, then monitoring the communication network onboard the vehicle for the fault condition; and
    upon detecting, on the onboard vehicle communication network, the fault condition, disabling the user assist feature.

18. The method of claim 15, further comprising, upon disabling the user assist feature, maintaining a current position of the vehicle.

19. The method of claim 15, further comprising, upon identifying the fault condition as transient, disabling the user assist feature additionally based on determining a specified future time is less than a predetermined time from a current time, the specified future time being a time when the vehicle is requested to arrive at a location of the user device.

20. The method of claim 15, further comprising, upon determining that at least one of the timer has expired or that the first message is received from the user device, transitioning the vehicle to a minimal power state and providing electrical power to a subset of vehicle components, the subset including each vehicle component associated with the user assist feature.

* * * * *